(12) United States Patent
Hilberer

(10) Patent No.: US 7,771,508 B2
(45) Date of Patent: Aug. 10, 2010

(54) METHOD FOR THE TREATMENT OF AIR AND AIR TREATMENT SYSTEM

(75) Inventor: Eduard Hilberer, Hockenheim (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 205 days.

(21) Appl. No.: 12/013,885

(22) Filed: Jan. 14, 2008

(65) Prior Publication Data

US 2008/0173173 A1    Jul. 24, 2008

Related U.S. Application Data

(63) Continuation of application No. PCT/EP2006/006902, filed on Jul. 14, 2006.

(30) Foreign Application Priority Data

Jul. 15, 2005    (DE)   .................. 10 2005 033 083

(51) Int. Cl.
*B01D 53/04* (2006.01)
*B60T 17/00* (2006.01)

(52) U.S. Cl. .................. 95/10; 95/11; 96/109; 96/115; 55/DIG. 17

(58) Field of Classification Search .................. 96/109, 96/111, 113, 114–116, 143, 144; 95/1, 8, 95/10, 11, 24, 117, 121–125, 148; 55/DIG. 17
See application file for complete search history.

(56) References Cited

U.S. PATENT DOCUMENTS 4,713,094 A * 12/1987 Yanagawa et al. ............. 96/147

| | | |
|---|---|---|
| 5,103,576 A | 4/1992 | Cramer et al. |
| 5,257,008 A | 10/1993 | Elamin |
| 5,592,754 A * | 1/1997 | Krieder et al. ............... 34/527 |
| 6,089,831 A | 7/2000 | Bruehmann et al. |

FOREIGN PATENT DOCUMENTS

| DE | 3139682 A1 | 5/1983 |
|---|---|---|
| DE | 3445699 A1 | 6/1986 |

(Continued)

OTHER PUBLICATIONS

Form PCT/IB/326; Form PCT/IB/373; Form PCT/ISA/237 with English translation (thirteen (13) pages.)

(Continued)

*Primary Examiner*—Frank M Lawrence
(74) *Attorney, Agent, or Firm*—Crowell & Moring LLP

(57) ABSTRACT

A method and system for the treatment of air, in particular for pneumatic brake systems of utility vehicles, is described. The method includes feeding compressed air to a compressed air storage tank through an air dryer, initiating a regeneration of the air dryer using regeneration air from the compressed air storage tank through the air dryer and discharged via a discharge valve, and calculating a theoretically required regeneration air quantity $Q_{Reg,th}$. If a presence of condensate is not detected in a region downstream of the air dryer, a regeneration using the theoretically required regeneration air quantity $Q_{Reg,th}$, is carried out. If the presence of condensate is detected, a regeneration is carried out using a corrected required regeneration air quantity $Q_{Reg,corr}$, the corrected required regeneration air quantity $Q_{Reg,corr}$ being greater than the theoretically required regeneration air quantity $Q_{Reg,th}$.

14 Claims, 2 Drawing Sheets

FOREIGN PATENT DOCUMENTS

| | | |
|---|---|---|
| DE | 44 21 575 A1 | 1/1996 |
| DE | 195 15 895 A1 | 10/1996 |
| DE | 196 20 851 A1 | 12/1997 |
| DE | 199 11 741 A1 | 9/2000 |
| DE | 699 14 104 T2 | 7/2004 |
| EP | 0 093 253 B2 | 11/1983 |
| EP | 0 808 756 B1 | 11/1997 |
| JP | 60-102920 A * | 6/1985 |
| WO | WO 97/11274 A1 | 3/1997 |

OTHER PUBLICATIONS

International Search Report dated Nov. 7, 2006 with an English translation of the pertinent portions (Four (4) pages).

* cited by examiner

METHOD FOR THE TREATMENT OF AIR AND AIR TREATMENT SYSTEM

CROSS REFERENCE TO RELATED APPLICATIONS

This application is a continuation of PCT International Application No. PCT/EP2006/006902, filed Jul. 14, 2006, which claims priority under 35 U.S.C. §119 to German Patent Application No. 10 2005 033 083.5 filed Jul. 15, 2005, the entire disclosures of which are herein expressly incorporated by reference.

BACKGROUND AND SUMMARY OF THE INVENTION

The invention relates to a method for the treatment of air, in particular for pneumatic brake systems of utility vehicles, having the steps of feeding compressed air to a compressed air storage tank through an air dryer, initiating a regeneration of the air dryer by virtue of regeneration air from the compressed air storage tank being conducted through the air dryer and discharged from there via a discharge valve, and calculating the theoretically required regeneration air quantity $Q_{Reg,th}$.

The invention also relates to an air treatment system for pneumatic brake systems of utility vehicles, having a compressed air source, an air dryer, a compressed air tank, a discharge valve and a regeneration valve.

Air treatment systems of the generic type serve to supply treated, that is to say in particular dried, compressed air to the brake system and other compressed air consumers of utility or commercial vehicles. The drying of the compressed air which is supplied by a compressor takes place in a dryer cartridge of an air filter. Since water remains in the dryer cartridge on account of the dehumidification of the air, it is necessary to regenerate said dryer cartridge from time to time. For this purpose, a discharge valve which is arranged between the compressor and the dryer unit is opened, and it is made possible by using other suitable valve switching processes for compressed air to flow from a compressed air storage tank, which was filled previously by the compressor, through the dryer unit in the reverse direction in order to then be discharged into the atmosphere through the discharge valve.

Since no compressed air can be fed into the tank during the regeneration, it is sought to keep the regeneration phases as short as possible. On the other hand, it is however also important not to end the regeneration too early, in order that sufficient drying of the filter unit can ultimately take place. It is therefore sought overall to conduct the optimum compressed air quantity through the dryer unit for the purpose of regeneration.

German Patent Documents DE 199 11 741 A1 and DE 34 45 699 A1 are concerned with said problem.

In DE 199 11 741 A1, the required regeneration time is determined on a theoretical basis. The method is therefore based on permanently input parameters of the compressor which vary over the service life of the compressor and of the compressed air supply system. It is therefore conceivable that an excessive accumulation of moisture in the air treatment system and therefore also in the connected brake system will not be detected early.

DE 34 45 699 A1 specifies a method which is based on a humidity regulating circuit. The method is therefore based on the measurement variable of a sensor which can drift over the course of its service life, for example as a result of contamination. There is therefore the risk of an excess accumulation of water in the systems in the case of said system too.

The exemplary embodiments of the invention are based on specifying a method and an air treatment system which ensure the selection of an optimum regeneration air quantity and reduce the risk of an excess accumulation of water in the system.

The invention improves on the generic method for example, in that the presence of condensate in a region downstream of the air dryer is detected, in that, in the absence of condensate, a regeneration is carried out with the theoretically required regeneration air quantity $Q_{Reg,th}$, and in that, in the presence of condensate, a regeneration is carried out with a corrected required regeneration air quantity $Q_{Reg,corr}$, with the corrected required regeneration air quantity $Q_{Reg,corr}$ being greater than the theoretically required regeneration air quantity $Q_{Reg,th}$. A base quantity of the required regeneration air is therefore calculated theoretically on the basis of the method according to the invention. Said base quantity should generally be sufficient for regeneration and the regeneration phase should not extend beyond those values. If it is however detected that condensate is present downstream of the air dryer, then it is to be assumed that the theoretically calculated regeneration air quantity is possibly insufficient. Use is consequently made of a corrected regeneration air quantity which is greater than the calculated base quantity.

In the simplest case, it is provided that the regeneration air quantities $Q_{Reg}$ are determined by setting the regeneration durations $t_{Reg}$. Under normal circumstances, the regeneration air quantity is related to the regeneration duration in a virtually linear relationship.

According to one preferred embodiment of the invention, it is provided that the presence of condensate in a condensate collecting tank in the region of the compressed air storage tank is detected. A condensate sensor can then be provided in a condensate collecting tank of said type, which condensate sensor is, in the simplest case, embodied as a switch. Said switch is actuated in the case of condensate being present, so that a corresponding signal is provided for a controller.

It can likewise be preferable that, in the presence of condensate, a regeneration is carried out with a corrected required regeneration duration $t_{Reg,corr}$ when the condensate quantity exceeds a predefined threshold value. It is accordingly possible, depending on the configuration of the method according to the invention, to permit a certain precipitated condensate quantity and to nevertheless operate with the theoretically calculated regeneration air quantity $Q_{Reg,th}$.

It can also be provided that the corrected required regeneration duration $t_{Reg,corr}$ is greater by a predefined time interval than the theoretically required regeneration duration $t_{Reg,th}$. This is a simple possibility for defining the corrected required regeneration duration $t_{Reg,corr}$ as a function of the theoretical regeneration duration $t_{Reg,th}$.

According to a further embodiment of the invention, it is provided that the corrected required regeneration duration $t_{Reg,corr}$ is calculated by multiplication of the theoretically required regeneration duration $t_{Reg,th}$. In this way, it is obtained the corrected regeneration duration $t_{Reg,corr}$ is defined in relation to the theoretical regeneration duration $t_{Reg,th}$.

The invention improves on the generic air treatment system in that a condensate sensor is arranged in the region downstream of the air dryer. In this way, the advantages and peculiarities of the method according to the invention are also realized within the context of an air treatment system.

The air treatment system is in particular provided for carrying out a method according to the invention.

The invention is now explained by way of example with reference to the appended drawings on the basis of particularly preferred embodiments.

Other objects, advantages and novel features of the present invention will become apparent from the following detailed description of the invention when considered in conjunction with the accompanying drawings.

DETAILED DESCRIPTION OF THE DRAWINGS

Figure 1:
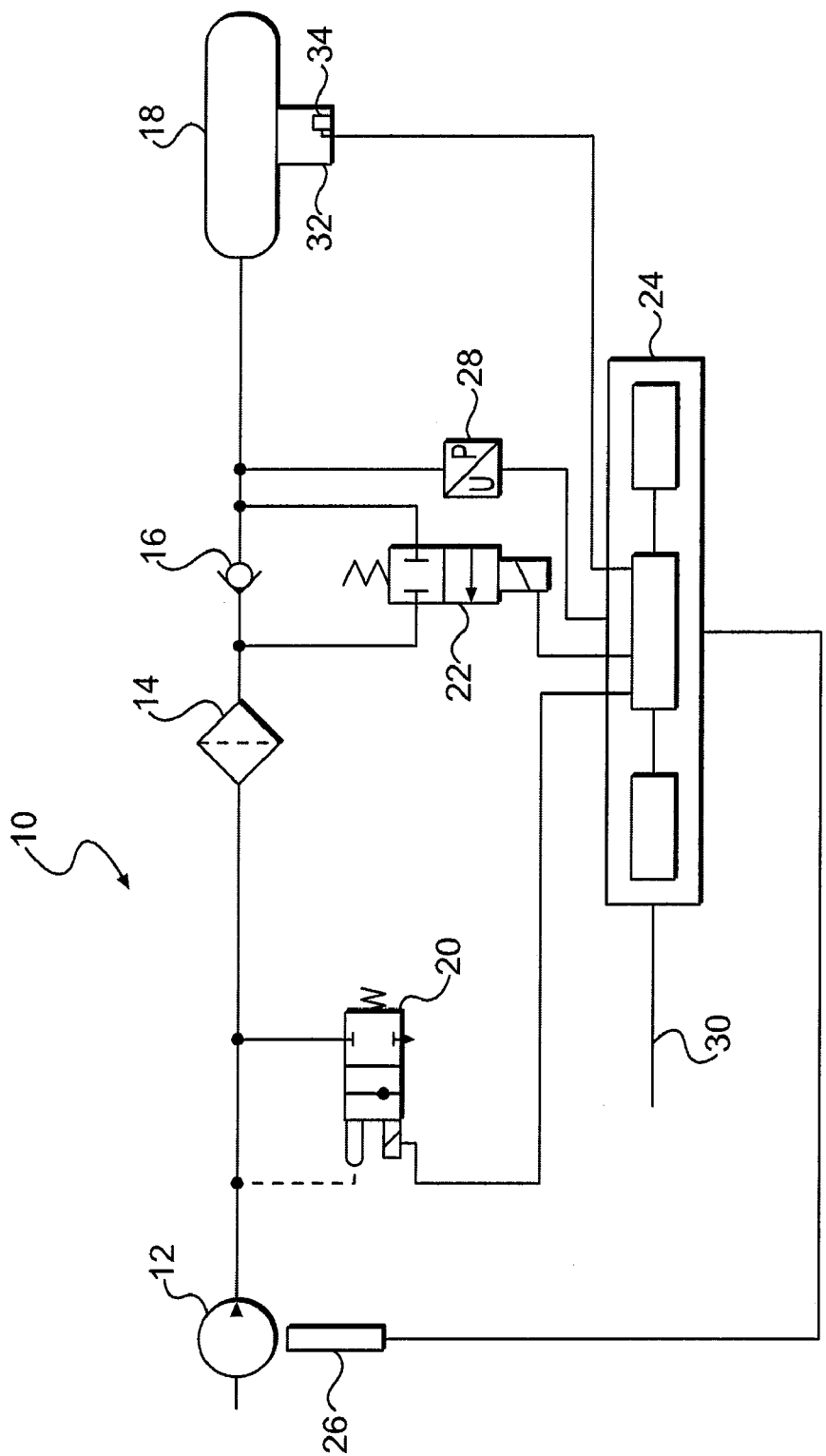
FIG. 1 shows a schematic circuit diagram of an air treatment system according to the invention.
Figure 2:
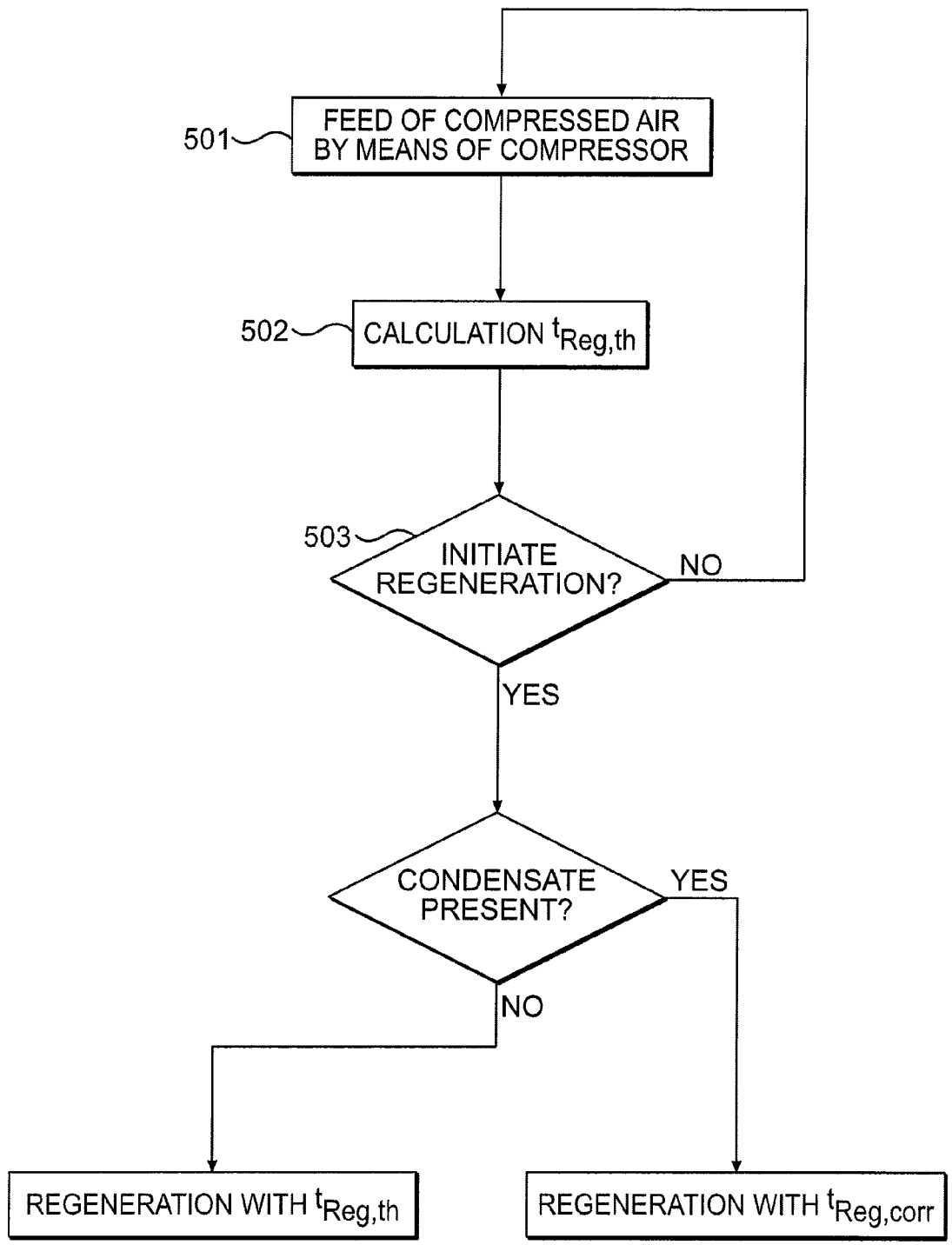
FIG. 2 shows a flow diagram for explaining a method according to the invention.

FIG. 1 shows a schematic circuit diagram of an air treatment system according to the invention. FIG. 2 shows a flow diagram for explaining a method according to the invention. Provided at an inlet of the air treatment system 10 is a compressor 12. The compressor 12 is connected by an air dryer 14 and a non-return valve 16 to a compressed air storage tank 18. The non-return valve 16 is arranged such that an air flow from the air dryer 14 to the compressed air storage tank 18 is permitted, but a return flow is prevented. Arranged between the compressor 12 and the air dryer 14 is a discharge valve 20. In addition, a solenoid valve 22 is provided parallel to the non-return valve 16 between the air dryer 14 and the compressed air storage tank 18. The air treatment system 10 also comprises an electronic control unit 24, a rotational speed sensor 26 for measuring the rotational speed of the compressor 12, and a pressure sensor 28 for measuring the pressure in the compressed air storage tank 18. Electrical signals of the rotational speed sensor 26 and of the pressure sensor 28 are supplied, along with other signals which are for example provided on a CAN bus 30, to the control unit 24. The control unit 24 also serves for commanding the activation of components of the air treatment system 10, for example the discharge valve 20 and the solenoid valve 22 which bypasses the non-return valve 16.

Also provided on the compressed air storage tank 18 is a condensate collecting tank 32 which has a condensate sensor 34. An output signal of said condensate sensor 34 is likewise provided to the electronic controller 24.

The air treatment system 10 according to the invention operates as follows. During feed operation, compressed air is fed by the compressor 12 via the air dryer 14 and the non-return valve 16 into the compressed air storage tank 18 (step S01 in FIG. 2). In said feed phase, the theoretical regeneration time can be determined continuously by using the control unit 24, wherein in particular the compressor rotational speed measured by the rotational speed sensor 26 is provided as input information. More detailed statements regarding the calculation method can be gathered from German Patent Document DE 199 11 741 A1, whose disclosure in this regard is included by reference in its entirety in the present specification. During the feed phase, the discharge valve 20 and the solenoid valve 22 are situated in their illustrated positions, that is to say both valves are closed. If a regeneration is now to be initiated (step S03 in FIG. 2), then the discharge valve 20 is opened by an electrical signal of the controller 24, wherein for the opening of the discharge valve 20, compressed air is likewise provided by the compressor 12. The solenoid valve 22 is likewise opened. Air can consequently escape from the compressed air storage tank 18 via the solenoid valve 22 and from the air dryer 14 via the discharge valve 20 into the atmosphere, and thereby regenerate the air dryer 14.

At the start of the regeneration time, it is checked with regard to its duration as to whether condensate is present in the condensate collecting tank 32 (step S04 in FIG. 2). If no condensate is present or only a small quantity of condensate is present, then the regeneration takes place with the theoretical regeneration duration $t_{Reg,th}$. In the other case, that is to say when condensate is present or an excessive quantity of condensate is present, the corrected regeneration time $t_{Reg,corr}$ is used, with it being possible for the latter to be calculated by simple arithmetical operations from the theoretical regeneration time $t_{Reg,th}$, for example by addition or multiplication. It is likewise conceivable for the corrected regeneration time to be a fixed predetermined regeneration time of long duration.

The features of the invention disclosed in the above description, in the drawings and in the claims can be useful in the realization of the invention both individually and also in any desired combination.

The following list of reference numeral is provided to help clarify the specification and drawings.

10 Air treatment system
12 Compressor
14 Air dryer
16 Non-return valve
18 Compressed air storage tank
20 Discharge valve
22 Solenoid valve
24 Control unit
26 Rotational speed sensor
28 Pressure sensor
30 CAN bus
32 Condensate collecting tank
34 Condensate sensor The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for the treatment of air, in particular for pneumatic brake systems of utility vehicles, comprising the acts of:
    feeding compressed air to a compressed air storage tank through an air dryer;
    initiating a regeneration of the air dryer using regeneration air from the compressed air storage tank being conducted through the air dryer and discharged from there via a discharge valve;
    calculating a theoretically required regeneration air quantity $Q_{Reg,th}$;
    detecting a presence of condensate in a region downstream of the air dryer;
    in the absence of detected condensate, carrying out a regeneration using the theoretically required regeneration air quantity $Q_{Reg,th}$, and;
    in the presence of detected condensate, carrying out a regeneration using a corrected required regeneration air quantity $Q_{Reg,corr}$, the corrected required regeneration air quantity $Q_{Reg,corr}$ being greater than the theoretically required regeneration air quantity $Q_{Reg,th}$.

2. The method as claimed in claim 1, wherein the regeneration air quantities $Q_{Reg}$ are determined by setting a regeneration durations $t_{Reg}$.

3. The method as claimed in claim 1, wherein the presence of condensate in a condensate collecting tank in the region of the compressed air storage tank is detected.

4. The method as claimed in claim 2, wherein, in the presence of condensate, the regeneration is carried out with a corrected required regeneration duration $t_{Reg,corr}$ when the condensate quantity exceeds a predefined threshold value.

5. The method as claimed in claim 2, wherein the corrected required regeneration duration $t_{Reg,corr}$ is greater by a predefined time interval than the theoretically required regeneration duration $t_{Reg,th}$.

6. The method as claimed in claim 2, wherein the corrected required regeneration duration $t_{Reg,corr}$ is calculated by multiplication of the theoretically required regeneration duration $t_{Reg,th}$.

7. An air treatment system for pneumatic brake systems of utility vehicles, comprising:
 a compressed air source;
 an air dryer;
 a compressed air tank;
 a discharge valve;
 a regeneration valve;
 a condensate sensor disposed in a region downstream of the air dryer, and
 a control unit, the control unit being configured to control the operation of the discharge valve and the regeneration valve for operation of the air treatment system to carry out a method as claimed in claim 1.

8. An air treatment system for pneumatic components of a vehicle, comprising:
 a source of compressed air operatively connected to vehicle consumers of compressed air;
 a storage device connected to the source of compressed air;
 an air drier disposed downstream of the compressed air source to reduce condensate in the compressed air flowing to the storage element; and
 a control unit for controlling regeneration of the air drier by commanding flowing of an amount of regeneration air based on a sensed amount of condensate, wherein the control unit commands a theoretical amount of regeneration air through the air dryer when the sensed amount of condensate is below a predefined threshold value and an amount of corrected regeneration air through the air dryer greater than the theoretical amount of regeneration air, when the sensed amount of condensate is above a predefined threshold value.

9. The air treatment system according to claim 8, further comprising a condensate sensor operatively connected to the control unit.

10. The air treatment system according to claim 8, further comprising a regeneration valve controlled by the control unit to direct regeneration air from the storage device to the air dryer.

11. The air treatment system according to claim 8, further comprising a discharge valve controlled by the control unit to vent the regeneration air from the air dryer.

12. The air treatment system according to claim 8, wherein the control unit computes a theoretical amount of regeneration air based on at least one of a rotational speed of a compressor and a pressure in the storage device.

13. The air treatment system according to claim 8 wherein the control unit computes the corrected regeneration air as at least one of an increment, a multiplier and a function of the theoretical amount of regeneration air.

14. The air treatment system according to claim 8, wherein the control unit commands at least one of an amount of regeneration air and a regeneration time for the air dryer.

* * * * *